US012734810B2

(12) United States Patent
Hitzlsperger et al.

(10) Patent No.: US 12,734,810 B2
(45) Date of Patent: Sep. 15, 2026

(54) DEVICE AND METHOD FOR ADJUSTING A PRINT BAR

(71) Applicant: Canon Production Printing Holding B.V., Venlo (NL)

(72) Inventors: Florian Hitzlsperger, Poing (DE); Ulrich Stöckle, Germering (DE); Claus Schneider, Eching (DE); Christoph Rummelsberger, Ismaning (DE); Alexander Zach, Hohenpolding (DE)

(73) Assignee: Canon Production Printing Holding B.V., Venlo (NL)

( * ) Notice: Subject to any disclaimer, the term of this patent is extended or adjusted under 35 U.S.C. 154(b) by 170 days.

(21) Appl. No.: 18/739,868

(22) Filed: Jun. 11, 2024

(65) Prior Publication Data

US 2024/0408877 A1 Dec. 12, 2024

(30) Foreign Application Priority Data

Jun. 12, 2023 (DE) ..................... 10 2023 115 217.3

(51) Int. Cl.
*B41J 2/165* (2006.01)
*B41J 2/15* (2006.01)

(52) U.S. Cl.
CPC ............. *B41J 2/16588* (2013.01); *B41J 2/15* (2013.01); *B41J 2/16535* (2013.01)

(58) Field of Classification Search
None
See application file for complete search history.

(56) References Cited

U.S. PATENT DOCUMENTS

| | | | | |
|---|---|---|---|---|
| 2004/0012650 | A1* | 1/2004 | Thiessen | B41J 11/0095 347/33 |
| 2007/0188545 | A1 | 8/2007 | Miyamoto | |
| 2012/0026241 | A1 | 2/2012 | Gaston et al. | |
| 2014/0111576 | A1 | 4/2014 | Vodopivec | |
| 2018/0178526 | A1* | 6/2018 | Lela | B41J 2/16585 |
| 2018/0229505 | A1* | 8/2018 | Eck | B41J 2/16588 |
| 2020/0114647 | A1* | 4/2020 | Andres | B41J 2/16544 |
| 2021/0373437 | A1 | 12/2021 | Cone et al. | |
| 2022/0040981 | A1 | 2/2022 | Stockle et al. | |
| 2022/0176703 | A1 | 6/2022 | Laubenberger et al. | |

FOREIGN PATENT DOCUMENTS

| | | | | |
|---|---|---|---|---|
| DE | 102020120541 A1 | | 2/2022 | |
| WO | WO-2016170383 A1 | * | 10/2016 | B41J 25/001 |

* cited by examiner

*Primary Examiner* — Leslie J Thompson
(74) *Attorney, Agent, or Firm* — The Webb Law Firm

(57) ABSTRACT

Provided is a device for adjusting the height of a print bar of an inkjet printing device. The printing device has a cleaning sled for cleaning the one or more print heads of the print bar. A controller including a processor is configured to determine, using a sensor unit, clearance information with regard to the clearance between the cleaning sled and the print bar at different measurement points, and to adjust the height of the print bar depending on the determined clearance information. A precise adjustment of the print bar can thus be effected for a qualitatively high-grade and gentle cleaning.

16 Claims, 2 Drawing Sheets

DEVICE AND METHOD FOR ADJUSTING A PRINT BAR

CROSS-REFERENCE TO RELATED APPLICATION

This application claims priority to German Patent Application No. 10 2023 115 217.3 filed Jun. 12, 2023, the disclosure of which is hereby incorporated by reference in its entirety.

BACKGROUND OF THE INVENTION

Field of the Invention

The invention relates to a method and a device for adjusting a print bar, in particular the height of a print bar, of an inkjet printing device, in particular in order to enable a reliable cleaning of the one or more print heads of the print bar.

Description of Related Art

An inkjet printing device for printing to a recording medium can comprise at least one print bar having one or more print heads, wherein each print head typically has a plurality of nozzles. The nozzles are respectively configured to eject ink droplets in order to print dots of a print image onto the recording medium.

During printing, a print head typically becomes fouled with ink, aerosols, and/or constituents of the recording medium. Furthermore, the ink in a print head dries in operating phases in which printing does not occur. The fouling of the print head and/or the drying of the ink can lead to a degradation of the print quality and/or to a failure of individual nozzles of the print head.

To clean a print head of a print bar, and/or to remedy dried or dried-on ink, the one or more nozzles of the print head can be flushed with ink during a cleaning process. The nozzle plate of the print head may also be wiped off with a wiper.

SUMMARY OF THE INVENTION

The present disclosure deals with the technical object of reliably enabling a gentle cleaning and a uniformly high cleaning quality of the one or more print heads of a print bar of an inkjet printing device. The object is achieved via the features as described herein. Furthermore, the object is achieved via the features as described herein.

According to one aspect of the invention, a device is described for adjusting a print bar of an inkjet printing device, wherein the printing device comprises a cleaning sled for cleaning nozzle plates of the one or more print heads of the print bar, and wherein the cleaning sled can be moved along a cleaning direction from a first side of the print bar to a second side of the print bar.

The device is configured to determine, using at least one sensor unit, clearance information with regard to the clearance between the cleaning sled and the print bar at least at two different measurement points along the cleaning direction. The device is also configured to adjust the clearance between the cleaning sled and the print bar depending on the clearance information, using at least one alignment element.

According to a further aspect, a method is described for adjusting a print bar of an inkjet printing device, wherein the printing device comprises a cleaning sled of the print bar, and wherein the cleaning sled can be moved along a cleaning direction from a first side of the print bar to a second side of the print bar.

The method comprises determining, using at least one sensor unit, clearance information with regard to the clearance between the cleaning sled and the print bar at least at two different measurement points along the cleaning direction. Furthermore, the method comprises adjusting the clearance between the cleaning sled and the print bar depending on the clearance information, using at least one alignment element.

BRIEF DESCRIPTION OF THE DRAWINGS

Exemplary embodiments of the invention are described in detail in the following using the schematic drawings. Thereby shown are.

DESCRIPTION OF THE INVENTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure. The connections shown in the figures between functional units or other elements can also be implemented as indirect connections, wherein a connection can be wireless or wired. Functional units can be implemented as hardware, software or a combination of hardware and software.

Figure 1A:
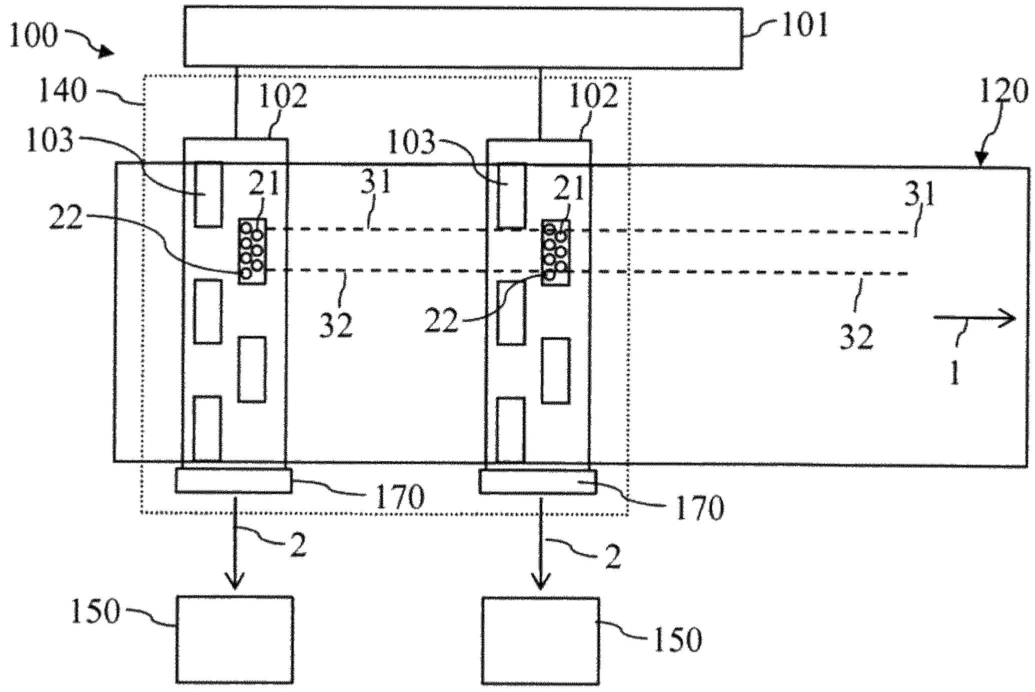
FIG. 1*a* a block diagram of an example of an inkjet printing device.

The printing device 100 depicted in FIG. 1*a* is designed for printing onto a recording medium 120 in the form of a sheet or page or plate or belt. The recording medium 120 can be produced from paper, paperboard, cardboard, metal, plastic, textiles, a combination thereof, and/or other materials that are suitable and can be printed to. The recording medium 120 is transported along the transport direction 1 (represented by an arrow) through the print group 140 of the printing device 100.

In the depicted example, the print group 140 of the printing device 100 comprises two print bars 102, wherein each print bar 102 can be used for printing with ink of a defined color, for example black, cyan, magenta, and/or yellow, and MICR ink if applicable. Furthermore, the printing device 100 typically comprises at least one fixing or drying unit (not shown) that is configured to fix a print image printed onto the recording medium 120.

A print bar 102 can comprise one or more print heads 103 that, if applicable, are arranged in a plurality of rows side-by-side in order to print the dots of different columns 31, 32 of a print image onto the recording medium 120. In the example depicted in FIG. 1*a*, a print bar 102 comprises five print heads 103, wherein each print head 103 prints the dots of a group of columns 31, 32 of a print image onto the recording medium 120.

In the embodiment illustrated in FIG. 1*a*, each print head 103 of the print group 140 comprises a plurality of nozzles 21, 22, wherein each nozzle 21, 22 is configured to fire or eject ink droplets onto the recording medium 120. For example, a print head 103 of the print group 140 can comprise multiple thousands of effectively utilized nozzles 21, 22 that are arranged along a plurality of rows transverse to the transport direction 1 of the recording medium 120. Dots of a line of a print image can be printed onto the recording medium 120 transverse to the transport direction 1, i.e. along the width of the recording medium 120, by means of the nozzles 21, 22 of a print head 103 of the print group 140.

The printing device 100 also comprises a controller 101 (for example an activation hardware and/or a processor) that is configured to drive actuators of the individual nozzles 21, 22 of the individual print heads 103 of the print group 140 in order to apply the print image onto the recording medium 120 depending on print data. In an exemplary embodiment, the controller 101 includes processing circuitry that is configured to perform one or more functions and/or operations of the controller 101, including activating the actuators of the individual nozzles 21, 22 of the individual print heads 103 of the print group 140 to apply the print image onto the recording medium 120 depending on print data, processing print data and/or other data, controlling one or more modes of the printing device 100 and/or controlling one or more operations of the printing device 100. In an exemplary embodiment, the controller 101 includes one or more interfaces (e.g. a wired and/or wireless input and/or output interface, transceiver, or the like) that is configured to receive or output data or information. For example, the controller 101 may receive signals generated by one or more components of the printing device 100 (e.g. from a user interface of the printer device 100) and/or output control signals to one or more components of the printing device 100. In an exemplary embodiment, the controller 101 includes a memory configured to store data/information, and/or store executable code that is executable by the processing circuitry to cause the processing circuitry to perform the operation(s) of the controller 101.

The print group 140 of the printing device 100 thus comprises at least one print bar 102 having N nozzles 21, 22 that can be driven with a defined line timing in order to print a line, said line traveling transverse to the transport direction 1 of the recording medium 120, with N pixels or N columns 31, 32 of a print image onto the recording medium 120 (with N>1000). In the depicted example, the nozzles 21, 22 are installed so as to be immobile or fixed in the printing device 100, and the recording medium 120 is directed past the stationary nozzles 21, 22 with a defined transport velocity along the transport direction 1.

Furthermore, the printing device 100 comprises one or more regeneration devices 150 for the one or more print bars 102. A print bar 102 can be transitioned from a printing position, at which the print bar 102 is arranged above the recording medium 120, into a cleaning or servicing position. For this purpose, the print bar 102 can be moved in the movement direction 2, indicated by an arrow, wherein the movement direction 2 can run orthogonal to the transport direction 1. In the cleaning or servicing position, the nozzle plates of the one or more print heads 103 of a print bar 102 can then be cleaned, for example wiped off, using a regeneration device 150. The printing device 100 can have at least or precisely one regeneration device 150 for each print bar 102.

Figure 1B:
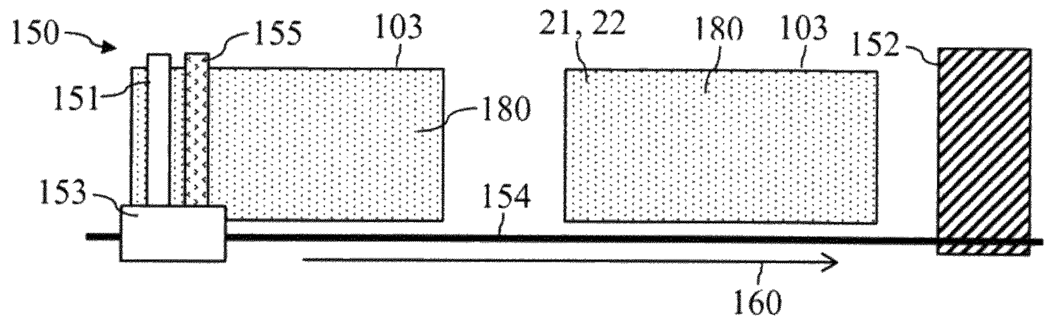
FIG. 1*b* an example of a regeneration device of an inkjet printing device, in a view from below.
Figure 1C:
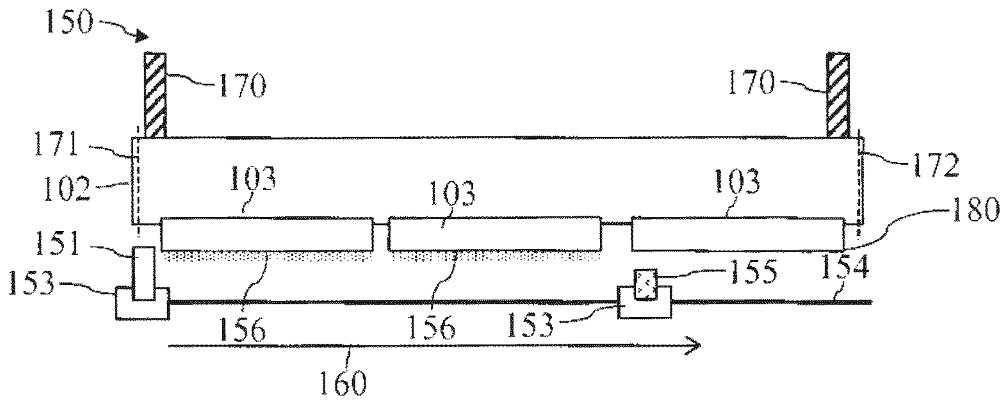
FIG. 1*c* an example of a regeneration device of an inkjet printing device, in a view from the side.

FIG. 1*b* shows a view of the regeneration device 150 from below toward the nozzle plates 180 of two print heads 103 of a print bar 102, and FIG. 1*c* shows a view of the regeneration device 150 from the side, with a print bar 102 having three print heads 103. The print heads 103 are arranged serially along a cleaning axis 160. The cleaning axis 160 typically runs parallel to the movement direction 2. Arranged on the underside or the nozzle plate 180 of a print head 103 are the outputs or nozzle openings of the one or more nozzles 21, 22 of the print head 103.

In the cleaning or servicing position, the one or more nozzles 21, 22 of the print head 103 can be induced to eject ink, for example by increasing the pressure within the one or more nozzles 21, 22. This step is typically referred to as "purging." Furthermore, the nozzle plate 180 of a print head 103 can be sprayed with a (cleaning) fluid 156 by one or more spray nozzles 155. The underside or nozzle plate 180 of a print head 103 can subsequently be cleaned with a wiper 151. The wiper 151 can be moved along the cleaning direction 160 across the nozzle plate 180 of a print head 103 in order to clean the nozzle plate 180 of ink that has remained on the nozzle plate 180. This step is typically referred to as "wiping."

The wiper 151 and/or a spray nozzle 155 can be attached (separately or together) to a cleaning sled 153 that is guided along the nozzle plate 180 of a print head 103 along a guide rail 154. A sled 153 can thereby guide one or more wipers 151 across the nozzle plates 180 of a plurality of print heads 103 (in particular all print heads 103) of a print bar 102. The fluid that is thereby wiped off can drip into a pan (not shown), wherein the pan is arranged below the sled 153. After the nozzle plates 180 of the one or more print heads 103 have been wiped off, the wiper 151 can be moved into a cleaning module 152 in which the wiper 151 is cleaned.

The print bar 102 can be designed such that the inclination of the print bar 102 can be varied along the cleaning direction 160, i.e. transverse to the transport direction 1. The print bar 102 can extend along the cleaning direction 160 from a first side 171 to an opposite second side 172. A respective alignment element 170 with which the print bar 102 can be aligned can be arranged on both sides 171, 172. In particular, the alignment elements 170 can respectively be designed to vary the height of the respective side 171, 172 of the print bar 102 along a height direction, wherein the height direction runs orthogonal to the cleaning direction 160 and orthogonal to the transport direction 1. The alignment elements 170 can respectively comprise an electric motor, in particular a stepper motor.

The alignment element 170 at the first side 171 of the print bar 102 can be used to increase or reduce the height of the first side 171 of the print bar 102, and therewith to move the print bar 102 away from the cleaning sled 153 or toward the cleaning sled 153 at the first side 171. Accordingly, the alignment element 170 at the second side 172 of the print bar 102 can be used to increase or reduce the height of the second side 172 of the print bar 102, and therewith to move the print bar 102 away from the cleaning sled 153 or toward the cleaning sled 153 at the second side 172. The inclination of the print bar 102 can thus be varied along the cleaning direction 160. The clearance between the cleaning sled 153 and the print bar 102 can thus also be varied, in particular between the wiper 151 arranged on the cleaning sled 153 and the nozzle plates 180 of the one or more print heads 103 of the print bar 102.

In order to effect a uniformly high cleaning quality of the nozzle plates 180 of the one or more print heads 103, the force with which the wiper 151 acts on the nozzle plates 180 should be constant along the entire cleaning direction 160, from the first side 171 to the second side 172 of the print bar 102. This can be achieved in that the clearance along the height direction between the wiper 151, or the sled 153, and the nozzle plates 180 is constant along the entire cleaning direction 160, from the first side 171 to the second side 172 of the print bar 102. This can in turn be effected by adjusting the inclination of the print bar 102 using the one or more alignment elements 170.

Figure 2:
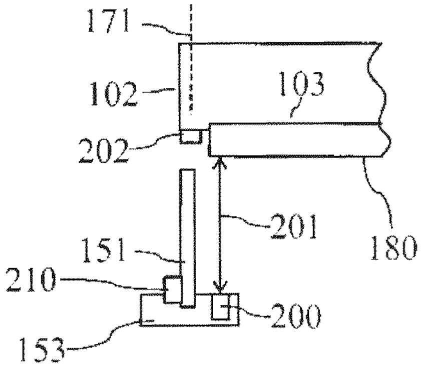
FIG. 2 a detail from FIG. 1*c*.

FIG. 2 shows a detail from FIG. 1*c*. Arranged on the sled 153 of the wiper 151 is at least one sensor unit 200, 210 that is designed to acquire clearance information with regard to the clearance 201 between the sled 153 or the wiper 151 and the print bar 102 or the one or more print heads 103.

The sensor unit 200, 210 can, for example, comprise a clearance sensor 200 that is configured to directly detect the clearance 201. A reference element 202 can be arranged on the underside of the print bar 102 or of a print head 103 facing toward the clearance sensor 200, which reference element 202 is possibly designed to reflect in a defined manner a measurement signal emitted by the clearance sensor 200, in order to enable a particularly precise clearance measurement. The clearance sensor 200 can be designed to detect the clearance 201 between the sled 153 and the reference element 202. Examples of clearance sensors 200 are ultrasound-based, optical, inductive, and/or capacitive clearance sensors.

Alternatively or additionally, the sensor unit 200, 210 can comprise a force and/or pressure sensor 210 that is configured to detect the force or the pressure with which the wiper 151 acts on the nozzle plate 180 of a print head 103. The force or the pressure is typically greater the closer that the sled 153 with the wiper 151 is arranged to the nozzle plate 180. The clearance 210 between nozzle plate 180 and sled 153 can consequently be concluded from the detected force or from the detected pressure. The pressure or the force with which the wiper 151 acts on the nozzle plate 180 of a print head 103 thus represents clearance information with regard to the clearance 201.

The controller 101 of the inkjet printing device 100 can be configured to determine, using the sensor unit 200, 210, clearance information with regard to the clearance 201 between the sled 153 or the wiper 151 and the print bar 102 at the first side 171 of the print bar 102. Clearance information with regard to the clearance 201 between the sled 153 or the wiper 151 and the print bar 102 at the second side 172 of the print bar 102 can also be determined using the sensor unit 200, 210. The alignment elements 170 can then be operated, depending on the determined clearance information, in order to align the print bar 102 along the cleaning direction 160 such that the clearance 201 between the wiper 151 and the print bar 102 remains constant, and if applicable exhibits a defined value, along the entire cleaning direction 160, from the first side 171 to the second side 172 of the print bar 102. A uniformly high cleaning quality can thus be efficiently and reliably effected. A gentle cleaning of the individual print heads 103 can thus also be effected, whereby the service life of the print heads 103 can be increased.

The print bar 102 can have a plurality of print heads 103 that are arranged serially along the cleaning direction 160. Following the alignment of the print bar 102 along the cleaning direction 160, clearance information with regard to the clearance 201 between the wiper 151 and the nozzle plates 180 of the individual print heads 103 can be acquired using the sensor unit 200, 210. In particular, it can be checked whether the individual print heads 103 exhibit a uniform clearance 201. In the event that a print head 103 exhibits a discrepant clearance 201, it can be concluded from this that this print head 103 is incorrectly installed in the print bar 102. One or more measures can then be initiated, for example the output of an notification via the user interface of the printing device 100, in order to effect that the incorrect installation of the print head 103 is corrected. The print quality of the printing device 100 can thus be increased.

In order to enable a correct, reproducible, and operator-independent height adjustment of the print bar 102, a sensor 200, 210 can thus be installed on the sled 153 of the wiper 151, which sensor 200, 210 is designed to determine the clearance 201 between the sled 153 and the surface 180 of the one or more print heads 103 that is cleaned. The sled 153 can be driven into a first position, and the sensor 200, 210 measures the clearance 201 at the first position. The first position can be arranged at the first side 171 of the print bar 102. The wiper sled 153 can subsequently be driven into a second position, and the sensor 200, 210 measures the clearance 201 at the second position. The second position can be arranged at the second side 172 of the print bar 102.

The clearance measurements can be evaluated and, if it is detected that the clearance 201 between the sled 153 and the one or more print heads 103 is incorrect, the height of the print bar 102 at the first side 171 and/or at the second side 172 of the print bar 102 can be adapted accordingly using the alignment elements 170. The process can, if necessary, be repeated until the height is set correctly. Alternatively or additionally, the pressure that is exerted on the wiper 151 by the individual print heads can be measured to measure the clearance.

The cleaning quality, the print quality, and the service life of the one or more print heads 103 can be increased via the correct adjustment of the wiper 151. In particular, an optimal contact of the wiper 151 with the surface 180 of the one or more print heads 103 can be effected in order to remove fluid 156 and/or ink from the surface 180. Furthermore, it can be effected that the wiper 151 acts with a defined force on the surface 180 of the one or more print heads 103, such that a damage to the coating of the surface 180 of the one or more print heads 103 can be avoided.

Figure 3:
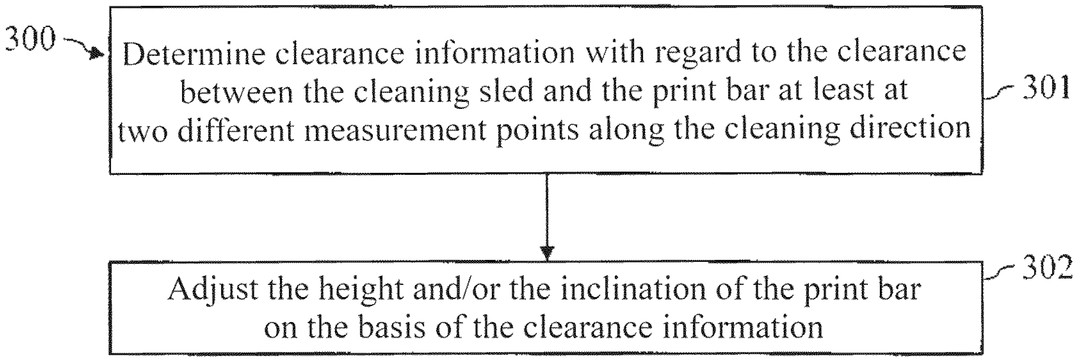
FIG. 3 a workflow diagram of an example of a method for adjusting a print bar of an inkjet printing device.

FIG. 3 shows a workflow diagram of an example of a, possibly computer-implemented, method 300 for adjusting a print bar 102 of an inkjet printing device 100 that has one or more print heads 103. The method 300 can in particular be designed to adjust the height of the print bar 102 along the height direction and/or the inclination of the print bar 102 along the cleaning direction 160. The method 300 can be executed while the print bar 102 is arranged in the servicing and/or cleaning position.

The printing device 100 has a cleaning sled 153 for cleaning the nozzle plates 180 of the one or more print heads 103. A wiper 151 for wiping off the nozzle plates 180 of the one or more print heads 103 can be arranged on the cleaning sled 153. A sensor unit 200, 210 can also be arranged on the cleaning sled 153. The cleaning sled 153 can be movable along the cleaning direction 160, from the first side 171 of the print bar 102 to the opposite second side 172 of the print bar 102. The first print head 103 of the print bar 102 can be arranged at the first side 171, and the last, for example the $K^{th}$, print head 103 of the print bar 102 can be arranged at the second side 172.

The method 300 comprises determining 301, using the at least one sensor unit 200, 210, clearance information with regard to the clearance 201 between the cleaning sled 153 and the print bar 102, in particular between the cleaning sled 153 and the nozzle plate 180 of a print head 103, at least at two different measurement points along the cleaning direction 160. A first measurement point can be arranged at the first side 171 of the print bar 102, and a second measurement point can be arranged at the second side 172 of the print bar 102. The sensor unit 200, 210 can be moved, together with the cleaning sled 153, along the cleaning direction 160 to the respective measurement point in order to determine the respective clearance information.

The method 300 also comprises adjusting 302, using at least one alignment element 170, the clearance 201 between the cleaning sled 153 and the print bar 102, depending on the clearance information, in particular such that the clearances 201 between the cleaning sled 153 and the print bar 102 at the first side 171 and at the second side 172 of the print bar 102 are identical after the adjustment.

In this disclosure, a controller 101 is thus described for adjusting a print bar 102 having one or more print heads 103 of an inkjet printing device 100. The printing device 100 comprises a cleaning sled 153 for cleaning the nozzle plates 180 of the one or more print heads 103. For this purpose, a wiper 151 can be arranged on the cleaning sled 153. The cleaning sled 153 can be moved along the cleaning direction 160, from a first side 171 of the print bar 102 to a second side 172 of the print bar 102, for example in order to wipe off the nozzle plates 180 of the one or more print heads 103 with the wiper 151. The cleaning direction 160 can run orthogonal to the transport direction 1.

The controller 101 is configured to determine, using at least one sensor unit 200, 210, clearance information with regard to the clearance 201 between the cleaning sled 153 and the print bar 102 at least at two different measurement points along the cleaning direction 160. The clearance information can in particular indicate the clearance 201 between the cleaning sled 153 and the nozzle plate 180 of the print head 103 arranged at the respective measurement point. The sensor unit 200, 210 can be designed to be moved together with the cleaning sled 153. For this purpose, the sensor unit 200, 210 can be attached to the cleaning sled 153.

The sensor unit 200, 210 can comprise a clearance sensor 200 that is configured to acquire sensor data with regard to the clearance 201 between the clearance sensor 200 and the print bar 102, in particular the nozzle plate 180 of a print head 103. In this instance, the clearance information can comprise sensor data of the clearance sensor 200 or at least be based on these sensor data.

Alternatively or additionally, the sensor unit 200, 210 can comprise a pressure sensor 210 that is configured to acquire sensor data with regard to the pressure that the wiper 151 arranged on the cleaning sled 153 exerts on the nozzle plate 180 of the print head 103 of the print bar 102 at the respective measurement point. In this instance, the clearance information can comprise sensor data, in particular pressure measurement values, of the pressure sensor 210, or be based on these sensor data. Different pressure measurement values at the different measurement points thereby indicate that the clearances 201 between the cleaning sled 153 and the print bar 102 are different at the different measurement points. The clearance information can be particularly efficiently and precisely determined via the use of a pressure sensor 210.

The controller 101 can be configured to determine, using the sensor unit 200, 210, clearance information with regard to the clearance 201 between the cleaning sled 153 and the print bar 102 at a first measurement point at the first side 171 of the print bar 102 and at a second measurement point at the second side 172 of the print bar 102. For example, the print bar 102 can comprise K print heads 103, possibly precisely K print heads 103, with K≥2, that are arranged serially along the cleaning direction 160. The first print head 103 can be arranged at the first side 171 of the print bar 102, and the $K^{th}$ print head 103 can be arranged at the opposite second side 172 of the print bar 102. Clearance information with regard to the clearance 201 between the cleaning sled 153 and the nozzle plate 180 of the first print head 103, and clearance information with regard to the clearance 201 between the cleaning sled 153 and the nozzle plate 180 of the $K^{th}$ print head 103, can thus be determined. A particularly precise adjustment of the print bar 102 can be effected by taking into account clearance information of measurement points that are arranged at the opposite sides 171, 172 of the print bar 102.

The controller 101 is also configured to adjust the clearance 201 between the cleaning sled 153 and the print bar 102 depending on the clearance information, using at least one alignment element 170. The inclination of the print bar 102 along the cleaning direction 160 can thereby be adjusted, in particular varied, depending on the clearance information, in particular using the alignment element 170. The clearance 201 between the cleaning sled 153 and the print bar 102 can thereby be adjusted depending on the clearance information, such that the clearance 201 between the cleaning sled 153 and the print bar 102, in particular between the cleaning sled 153 and the nozzle plate 180 of the first print head 103 at the first side 171 of the print bar 102, and the clearance 201 between the cleaning sled 153 and the print bar 102, in particular between the cleaning sled 153 and the nozzle plate 180 of the $K^{th}$ print head 103 at the second side 172 of the print bar 102, are at least essentially identical. For example, this can be achieved if the clearances 201 deviate from one another by less than 10%, or by less than 5%.

The cleaning sled 153 is typically arranged below the print bar 102 along the height direction, in particular below the nozzle plates 180 of the one or more print heads 103. The adjustment of the clearance 201 can be effected in that the height of the print bar 102 is varied using the one or more alignment unit 170. The one or more alignment units 170 can respectively comprise an electrical motor, in particular a stepper motor.

The printing device 100 can, for example, have a first alignment element 170 at the first side 171 of the print bar 102 and a second alignment element 170 at the second side 172 of the print bar 102. The controller 101 can be configured to drive the first and/or the second alignment element 170, depending on the clearance information, in order to adjust the clearance 201 between the cleaning sled 153 and the print bar 102, and/or in order to adjust the inclination of the print bar 102 along the cleaning direction 160. A particularly precise adjustment of the clearance 201 can thus be effected.

A controller 101 for adjusting the height of a print bar 102 of an inkjet printing device 100 is thus described, wherein the printing device 100 has a cleaning sled 153 for cleaning the one or more print heads 103 of the print bar 102. The controller 101 is configured to determine, using a sensor unit 200, 210, clearance information with regard to the clearance 201 between the cleaning sled 153 and the print bar 102 at different measurement points, and to adjust the height and/or the inclination of the print bar 102 depending on the determined clearance information. A precise adjustment of the print bar 102 for a qualitatively high-grade and gentle cleaning can thus be effected. The print quality of the printing device 100 can thus also be increased.

The print bar 102 can comprise a first print head 103 and a second print head 103 different therefrom. The controller 101 can be configured to determine, using the sensor unit 200, 210, first clearance information with regard to the clearance 201 between the cleaning sled 153 and the nozzle plate 180 of the first print head 103. For this purpose, the cleaning sled 153 with the sensor unit 200, 210 can be positioned below the nozzle plate 180 of the first print head 103. The device can also be configured to determine, using the sensor unit 200, 210, second clearance information with regard to the clearance 201 between the cleaning sled 153 and the nozzle plate 180 of the second print head 103. For this purpose, the cleaning sled 153 with the sensor unit 200, 210 can be positioned below the nozzle plate 180 of the second print head 103.

Furthermore, the controller 101 can be configured to detect, on the basis of the first clearance information and on the basis of the second clearance information, whether the first print head 103 and/or the second print head 103 are incorrectly installed in the print bar 102. If applicable, a notification can be output in order to inform a user of the printing device 100 that an incorrectly installed print head 103 has been detected. The print quality of the printing device 100 can thus be further increased.

The device can be configured to determine the first clearance information and the second clearance information in order to detect whether the first print head 103 and/or the second print head 103 are incorrectly installed in the print bar 102, before and/or after the clearance 201 between the cleaning sled 153 and the print bar 102 is or has been adjusted depending on the clearance information determined at different measurement points. In particular, an adjustment of the inclination of the print bar 102 can initially be effected before clearance information is acquired to detect an incorrectly installed print head 103. An incorrectly installed print head 103 can thus be particularly reliably detected.

Furthermore, in this disclosure an inkjet printing device 100 is described that comprises the control controller 101 described in this disclosure.

To enable those skilled in the art to better understand the solution of the present disclosure, the technical solution in the embodiments of the present disclosure is described clearly and completely below in conjunction with the drawings in the embodiments of the present disclosure. The embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms “first”, “second”, etc. in the description, claims and abovementioned drawings of the present disclosure are used to distinguish between similar objects, but not necessarily used to describe a specific order or sequence. It should be understood that data used in this way can be interchanged as appropriate so that the embodiments of the present disclosure described here can be implemented in an order other than those shown or described here. In addition, the terms “comprise” and “have” and any variants thereof are intended to cover non-exclusive inclusion. For example, a process, method, system, product or equipment comprising a series of steps or modules or units is not necessarily limited to those steps or modules or units which are clearly listed, but may comprise other steps or modules or units which are not clearly listed or are intrinsic to such processes, methods, products or equipment.

References in the specification to “one embodiment,” “an embodiment,” “an exemplary embodiment,” etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

For the purposes of this discussion, the term “processing circuitry” shall be understood to be circuit(s) or processor(s), or a combination thereof. A circuit includes an analog circuit, a digital circuit, data processing circuit, other structural electronic hardware, or a combination thereof. A processor includes a microprocessor, a digital signal processor (DSP), central processor (CPU), application-specific instruction set processor (ASIP), graphics and/or image processor, multi-core processor, or other hardware processor. The processor may be “hard-coded” with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST

1 transport direction (of the recording medium)
2 movement direction (of a print bar)
21, 22 nozzle
31, 32 column (of the print image)
100 printing device
101 controller
102 print bar
103 print head
120 recording medium
140 print group
150 regeneration device
151 cleaning unit (wiper)
152 cleaning module
153 sled/wiper mount
154 guide rail
155 application unit (spray nozzle)
156 (cleaning) fluid
160 cleaning direction
170 alignment element
171, 172 side of the print bar
180 nozzle plate
200 sensor unit (clearance sensor)
201 clearance
202 reference element
210 sensor unit (pressure sensor)
300 method for adjusting a print bar
301-302 method steps

The invention claimed is:

1. An inkjet printing device comprising:
   - a print bar having one or more print heads; a cleaning sled for cleaning nozzle plates of the one or more print heads; wherein the cleaning sled can be moved along a cleaning direction from a first side of the print bar to a second side of the print bar; and
   - a controller comprising at least one processor configured to:
     - determine, using at least one sensor unit, clearance information with regard to a clearance between the cleaning sled and the print bar at least at two different measurement points along the cleaning direction; and
     - adjust the clearance between the cleaning sled and the print bar depending on the clearance information, using at least one alignment element,
   - wherein
     - the one or more print heads of the print bar comprises at least a first print head and a second print head; and
     - the at least one processor is further configured to:
       - determine, using the at least one sensor unit, first clearance information with regard to the clearance between the cleaning sled and a nozzle plate of the first print head;
       - determine, using the at least one sensor unit, second clearance information with regard to the clearance between the cleaning sled and a nozzle plate of the second print head; and
       - detect, on the basis of the first clearance information and the second clearance information, whether the first print head and/or the second print head are incorrectly installed in the print bar.

2. The inkjet printing device according to claim 1, wherein the at least one processor is configured to determine, using the sensor unit, clearance information with regard to the clearance between the cleaning sled and the print bar at a first measurement point at the first side of the print bar and at a second measurement point at the second side of the print bar.

3. The inkjet printing device according to claim 2, wherein
   - the one or more print heads comprises K print heads, with K≥2, that are arranged serially along the cleaning direction; and
   - the first print head is arranged at the first side of the print bar, and a $K^{th}$ print head is arranged at the second side of the print bar.

4. The inkjet printing device according to claim 1, wherein the at least one processor is configured to adjust an inclination of the print bar along the cleaning direction depending on the clearance information, using the at least one alignment element.

5. The inkjet printing device according to claim 1, wherein:
   - the at least one alignment element comprises a first alignment element at the first side of the print bar and a second alignment element at the second side of the print bar; and
   - the at least one processor is configured to drive the first and/or the second alignment element, depending on the clearance information, in order to adjust the clearance between the cleaning sled and the print bar, and/or in order to adjust an inclination of the print bar along the cleaning direction.

6. The inkjet printing device according to claim 1, wherein the at least one processor is configured to adjust the clearance between the cleaning sled and the print bar, depending on the clearance information, such that clearances between the cleaning sled and the print bar at the first side of the print bar and at the second side of the print bar are identical.

7. The inkjet printing device according to claim 1, wherein the sensor unit comprises
   - a clearance sensor that is configured to acquire sensor data with regard to the clearance between the clearance sensor and the print bar; and/or
   - a pressure sensor that is configured to acquire sensor data with regard to a pressure that a wiper arranged on the cleaning sled exerts on a nozzle plate of the one or more print heads of the print bar.

8. The inkjet printing device according to claim 1, wherein the at least one processor is configured to determine the first clearance information and the second clearance information in order to detect whether the first print head and/or the second print head are incorrectly installed in the print bar, before and/or after the clearance between the cleaning sled and the print bar is or has been adjusted depending on the clearance information determined at different measurement points.

9. A method for adjusting a print bar having one or more print heads of an inkjet printing device; wherein the printing device comprises a cleaning sled for cleaning nozzle plates of the one or more print heads; wherein the cleaning sled can be moved along a cleaning direction from a first side of the print bar to a second side of the print bar, the method comprising:
   - determining, using at least one sensor unit, clearance information with regard to a clearance between the cleaning sled and the print bar at least at two different measurement points along the cleaning direction; and adjusting, using at least one alignment element, the clearance between the cleaning sled and the print bar, depending on the clearance information wherein the one or more print heads of the print bar comprises at least a first print head and a second print head; and the method further comprises:

determining, using the at least one sensor unit, first clearance information with regard to the clearance between the cleaning sled and a nozzle plate of the first print head;

determining, using the at least one sensor unit, second clearance information with regard to the clearance between the cleaning sled and a nozzle plate of the second print head; and detecting, on the basis of the first clearance information and the second clearance information, whether the first print head and/or the second print head are incorrectly installed in the print bar.

10. The method according to claim 9, further comprising determining, using the at least one sensor unit, clearance information with regard to the clearance between the cleaning sled and the print bar at a first measurement point at the first side of the print bar and at a second measurement point at the second side of the print bar.

11. The method according to claim 10, wherein the one or more print heads of the print bar comprises K print heads, with $K \geq 2$, that are arranged serially along the cleaning direction; and the first print head is arranged at the first side of the print bar, and a $K^{th}$ print head is arranged at the second side of the print bar.

12. The method according to claim 9, further comprising adjusting an inclination of the print bar along the cleaning direction depending on the clearance information, using the at least one alignment element.

13. The method according to claim 9, wherein the inkjet printing device wherein:

the at least one alignment element comprises a first alignment element at the first side of the print bar and a second alignment element at the second side of the print bar; and the method further comprises driving the first and/or the second alignment element, depending on the clearance information, in order to adjust the clearance between the cleaning sled and the print bar, and/or in order to adjust an inclination of the print bar along the cleaning direction.

14. The method according to claim 9, further comprising adjusting the clearance between the cleaning sled and the print bar, depending on the clearance information, such that clearances between the cleaning sled and the print bar at the first side of the print bar and at the second side of the print bar are identical.

15. The method according to claim 9, wherein the sensor unit comprises a clearance sensor that is configured to acquire sensor data with regard to the clearance between the clearance sensor and the print bar; and/or a pressure sensor that is configured to acquire sensor data with regard to a pressure that a wiper arranged on the cleaning sled exerts on a nozzle plate of the one or more print heads of the print bar.

16. The method according to claim 9, further comprising determining the first clearance information and the second clearance information in order to detect whether the first print head and/or the second print head are incorrectly installed in the print bar, before and/or after the clearance between the cleaning sled and the print bar is or has been adjusted depending on the clearance information determined at different measurement points.

* * * * *